United States Patent
Kwon et al.

(10) Patent No.: US 8,135,438 B2
(45) Date of Patent: Mar. 13, 2012

(54) MANAGING CALL CONTROL IN COMPUTER TELEPHONE INTERFACE (CTI) SYSTEM

(75) Inventors: Soon-Hyun Kwon, Suwon-si (KR); Seung-Ku Lee, Suwon-si (KR); Ji-Wook Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 925 days.

(21) Appl. No.: 11/878,918

(22) Filed: Jul. 27, 2007

(65) Prior Publication Data

US 2008/0051140 A1    Feb. 28, 2008

(30) Foreign Application Priority Data

Aug. 25, 2006  (KR) .................. 10-2006-0081026

(51) Int. Cl.
H04B 1/38    (2006.01)

(52) U.S. Cl. ... 455/557; 455/555; 709/206; 379/207.02; 379/225

(58) Field of Classification Search .................. 455/557, 455/555; 379/207.02, 225; 709/206
See application file for complete search history.

(56) References Cited

U.S. PATENT DOCUMENTS

| | | | |
|---|---|---|---|
| 6,324,266 B1 | 11/2001 | Mannings | |
| 6,606,495 B1 | 8/2003 | Korpi et al. | |
| 6,888,930 B1 * | 5/2005 | Hartselle et al. | 379/88.22 |
| 2005/0141688 A1 * | 6/2005 | Wengrovitz | 379/207.02 |
| 2005/0149617 A1 * | 7/2005 | Turnbull et al. | 709/203 |

FOREIGN PATENT DOCUMENTS

| KR | 2002-0041133 | 6/2002 |
|---|---|---|
| KR | 2004-0041905 | 5/2004 |

* cited by examiner

Primary Examiner — Dwayne Bost
Assistant Examiner — Amancio Gonzalez
(74) Attorney, Agent, or Firm — H.C. Park & Associates, PLC

(57) ABSTRACT

A method and apparatus to manage call control in a Computer Telephone Interface (CTI) system includes: a computer terminal to generate a call control message including call control identification information using a CTI application program in response to a call control command from a user, and transmitting the generated call control message; wireless terminals to perform call control upon receipt of the call control message; and an exchange to receive the call control message from the computer terminal, and to maintain the call control message generated by the computer terminal unchanged and to interface it to a corresponding one of the wireless terminals in response to the call control identification information being detected from the received call control message.

23 Claims, 7 Drawing Sheets

FIG. 5

| KEY | Index | Sub_index |
|---|---|---|
| KEY_HOLD | 0x20 | |
| KEY_T | 0x22 | |
| KEY_MUTE | 0x26 | |
| KEY_SEND | 0x40 | |
| KEY_END | 0x41 | |
| KEY_MENU | 0x42 | |
| KEY_OK | 0x43 | |
| KEY_CANCEL | 0x44 | |
| KEY_LEFT | 0x45 | |
| KEY_RIGHT | 0x46 | |
| KEY_UP | 0x47 | |
| KEY_DOWN | 0x48 | |
| KEY_DIGIT | 0x49 | ASCII code : 0 ~9, *, # |
| KEY_VOL_UP | 0x68 | |
| KEY_VOL_DOWN | 0x69 | |

MANAGING CALL CONTROL IN COMPUTER TELEPHONE INTERFACE (CTI) SYSTEM

CLAIM OF PRIORITY

This application makes reference to, incorporates the same herein, and claims all benefits accruing under 35 U.S.C. §119 from an application for APPARATUS AND METHOD FOR MANAGING CALL CONTROL IN COMPUTER TELEPHONE INTERFACE SYSTEM earlier filed in the Korean Intellectual Property Office on 25 Aug. 2006 and there duly assigned Ser. No. 2006-81026.

BACKGROUND OF THE INVENTION

1. Field of the Invention

The present invention relates to a method and apparatus to manage call control in a Computer Telephone Interface (CTI) system.

2. Description of the Related Art

In typical telephone systems, such as a keyphone and an exchange, a Computer Telephone Interface (CTI) executes application software for providing functions including call processing, automatic dialing, automatic screen pop-up and switching, and calling-number identification, together with additional functions including voice storage and restore, voice recognition, and facsimile interfacing.

A link configuration of the CTI is suitable for simple applications supporting a small group of users and a single user, and for complex applications requiring call tracking and transfer services for mid-size or larger groups, such as servers. Furthermore, a CTI server shares computer resources, such as functions or applications, with other servers, and is used in an environment including a Data Signal Processing (DSP) system for system architecture flexibility.

A CTI system builds a CTI driver on a computer for performing a telephone function using typical application software through a Computer Telephone Integration (CTI) Application Programming Interface (API), which supports the Telephony Application Programming Interface (TAPI)/Telephony Standard application Programming Interface (TSPI) standard.

The operation of a CTI system including a computer terminal for transmitting and receiving a call control message to and from a wireless terminal by building such a CTI driver is described as follows.

FIG. 1 is a signal flow diagram of the operation of controlling a wireless terminal using a computer terminal of a CTI system.

Referring to FIG. 1, the CTI system includes a computer terminal 10, an exchange 20, and a number of wireless terminals 30.

When a request to control the wireless terminal 30 has been received from a user (S1), the computer terminal 10 calls a CTI command using a CTI command API in response to the request to control the input wireless terminal 30 (S2).

The computer terminal 10 then calls a CTI driver through an API function of the CTI command API (S3), so that the CTI command is transmitted to the exchange 20 via an exchange interface driver (S4).

The exchange 20 receives the CTI command from the computer terminal 10 via a computer interface (S5) and parses the received CTI command using a parsing routine (S6).

The exchange 20 confirms a terminal-state-information management routine from the parsed CTI command and recognizes a call control routine for the wireless terminal 30 to be controlled (S7).

The exchange 20 then calls a call control command routine for the call wireless terminal 30 through the call control routine, generates a call control command using a typical SIP or an internal protocol of the wireless terminal 30 (S8), and transmits the generated call control command to the wireless terminal 30 via its wireless-terminal interface (S9).

The wireless terminal 30 receives the call control command from the exchange 20 via its exchange interface (S10), and parses the received call control command using a call control command parsing routine for the wireless terminal 30 (S11).

The wireless terminal 30 activates a call control function to process the requested call control (S12).

FIG. 2 is a signal flow diagram of the operation of controlling a computer terminal using a wireless terminal of a CTI system.

As shown in FIG. 2, when a user's request to effect voice communication with the computer terminal 10 or to terminate ongoing voice communication has been received (S21), the wireless terminal 30 generates a wireless-terminal call control event message through its call control function (S22).

The wireless terminal 30 generates the call control event message using an SIP or an internal protocol of the exchange 20 and the wireless terminal 30.

The wireless terminal 30 transmits the generated call control event message to the exchange 20 via its exchange interface (S23).

When the call control event message has been received from the wireless terminal 30 via its wireless-terminal interface (S24), the exchange 20 parses the received call control event message using an event parsing routine (S25), and recognizes state information of the wireless terminal 30 using a state-information management routine for the wireless terminal 30 (S26).

Recognizing the state information of the wireless terminal 30, the exchange 20 performs call control through a call control routine based on the recognized state information of the wireless terminal 30 (S27).

The exchange 20 generates a CTI event message in response to the call control event message from the wireless terminal 30 (S28), and transmits the generated CTI event message to the computer terminal 10 via the computer interface (S29).

When the CTI event message is received from the exchange 20 via the exchange interface driver (S30), the computer terminal 10 calls the CTI event API using the CTI driver (S31) and finally processes the received CTI event message using the CTI event ATI (S32).

Since the CTI system needs to support a TAPI-based CTI API to process messages transmitted and received between the computer terminal 10 and the wireless terminal 30, the CTI system must be fully built even for simply controlling the wireless terminal 30. This reduces economic efficiency and increases development and manufacturing costs.

SUMMARY OF THE INVENTION

It is an object of the present invention to provide an apparatus and method to manage call control in a Computer Telephone Interface (CTI) system which is capable of building a CTI system without using Telephony Application Programming Interface (TAPI), so that a call control message is transmitted and received between a computer terminal and a wireless terminal.

A first aspect of the present invention provides a Computer Telephone Interface (CTI) system including: a computer terminal to generate a call control message including call control identification information using a CTI application program in response to a call control command from a user, and to transmit the generated call control message; wireless terminals to perform call control upon receipt of the call control message; and an exchange to receive the call control message from the computer terminal, and to maintain the call control message generated by the computer terminal unchanged and to interface it to a corresponding one of the wireless terminals in response to the call control identification information being detected from the received call control message.

The computer terminal preferably includes a keypad user interface for the user using the CTI application program and recognizes key values, input via the keypad user interface, as the call control command.

The computer terminal preferably presets and stores indexes corresponding to key values of the keypad user interface, converts key values input according to the call control command into corresponding ones of the stored indexes, and generates a call control message including the converted indexes.

The computer terminal preferably includes the call control identification information before each converted index in generating the call control message.

The call control message preferably includes a call request message, a call response message, and a call termination message.

The computer terminal preferably includes: a CTI application program unit to provide a keypad user interface, to store indexes corresponding to key values of the keypad user interface, to convert key values associated with the call control command input from the user into corresponding indexes, and to generate a call control message including the converted indexes; and a display unit to display the keypad user interface provided by the CTI application program unit.

The CTI application program unit preferably includes an exchange interface driver to convert the key values associated with the call control command into the corresponding indexes, including the call control identification information before each converted index to generate the call control message, and to transmit the generated call control message to the exchange.

The exchange preferably includes: a computer-terminal interface to receive the call control message from the computer terminal; a controller to detect the call control identification information from the call control message received from the computer-terminal interface; and a wireless-terminal interface to maintain the call control message generated by the computer terminal unchanged and to interface it to the wireless terminal in response to the controller detecting the call control identification information from the call control message.

A second aspect of the present invention provides a Computer Telephone Interface (CTI) system including: wireless terminals to generate a call control message including call control identification information in response to a call control command from a user, and to transmit the generated call control message; a computer terminal to perform call control using a CTI application program upon receipt of the call control message; and an exchange to receive the call control message from the wireless terminal and to maintain the call control message generated by the wireless terminal unchanged and to interface it to the computer terminal in response to the call control identification information being detected from the received call control message.

Each wireless terminal preferably includes a keypad unit and recognizes key values, input via the keypad unit, as the call control command. Each wireless terminal preferably presets and stores indexes corresponding to key values of the keypad, converts key values input according to the call control command into corresponding ones of the stored indexes, and generates a call control message including the converted indexes. Each wireless terminal preferably includes the call control identification information before each converted index in generating the call control message. Each wireless terminal preferably includes: a keypad including a number of keys and receiving key values for call control by the user; a controller to preset and store indexes corresponding to key values of the keypad, to receive key values associated with the call control command, to convert the received key values to corresponding ones of the stored indexes including the call control identification information before each index, and to generate a call control message including the indexes with the call control identification information; and an exchange interface to transmit the generated call control message to the exchange.

The exchange preferably includes: a wireless-terminal interface to receive the call control message from one of the wireless terminals; a controller to detect the call control identification information from the call control message received from the wireless-terminal interface; and a computer-terminal interface to maintain the call control message generated by the wireless terminal unchanged and to interface it to the computer terminal in response to the controller detecting the call control identification information from the call control message.

A third aspect of the present invention provides a method of controlling a call in a Computer Telephone Interface (CTI) system, the method including: generating, by a computer terminal, a call control message including call control identification information using a CTI application program in response to a call control command from a user; transmitting, by the computer terminal, the generated call control message to an exchange; maintaining, by the exchange, the call control message generated by the computer terminal unchanged and interfacing it to a wireless terminal in response to detecting the call control identification information from the received call control message; and performing, by the wireless terminal, call control in response to the interfaced call control message.

Generating, by a computer terminal, a call control message including call control identification information using a CTI application program in response to a call control command from a user preferably includes: providing a keypad user interface to the user using the CTI application program; and receiving, as the call control command, key values for call control from the user via the keypad user interface.

Generating, by a computer terminal, a call control message including call control identification information using a CTI application program in response to a call control command from a user preferably further includes: resetting and storing indexes corresponding to key values of the keypad user interface; converting the key values into corresponding ones of the stored indexes in response to the key values associated with the call control command being received from the user via the keypad user interface; and generating the call control message including the converted indexes.

Generating, by a computer terminal, a call control message including call control identification information using a CTI application program in response to a call control command from a user preferably further includes including the call control identification information before each converted index.

Generating, by a computer terminal, a call control message including call control identification information using a CTI application program in response to a call control command from a user preferably further includes generating a call control message including at least one of a call request message, a call response message, and a call termination message.

A fourth aspect of the present invention provides a method of controlling a call in a Computer Telephone Interface (CTI) system, the method including: generating, by a wireless terminal, a call control message including call control identification information in response to a call control command from a user, and transmitting the generated call control message to an exchange; maintaining, by the exchange, the call control message generated by the wireless terminal unchanged and interfacing it to a computer terminal in response to detecting the call control identification information from the received call control message; and performing, by the computer terminal, call control using a CTI application program according to the interfaced call control message.

Generating, by a wireless terminal, a call control message including call control identification information in response to a call control command from a user, and transmitting the generated call control message to an exchange preferably includes providing a keypad to the wireless terminal and receiving, as the call control command, key values for call control from the user via the keypad.

Generating, by a wireless terminal, a call control message including call control identification information in response to a call control command from a user, and transmitting the generated call control message to an exchange preferably further includes: resetting and storing indexes corresponding to key values of the keypad; converting key values into corresponding ones of the stored indexes in response to the key values associated with the call control command being received from the user via the keypad; and generating the call control message including the converted indexes.

Generating, by a wireless terminal, a call control message including call control identification information in response to a call control command from a user, and transmitting the generated call control message to an exchange preferably further includes including the call control identification information before each converted index.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein:

FIG. 5 is a table of call control indexes according to an exemplary embodiment of the present invention;

DETAILED DESCRIPTION OF THE INVENTION

Hereinafter, exemplary embodiments of the present invention are described in detail with reference to the accompanying drawings. For the sake of clarity and conciseness, matters related to the present invention that are well known in the art have not been described.

Figure 1:
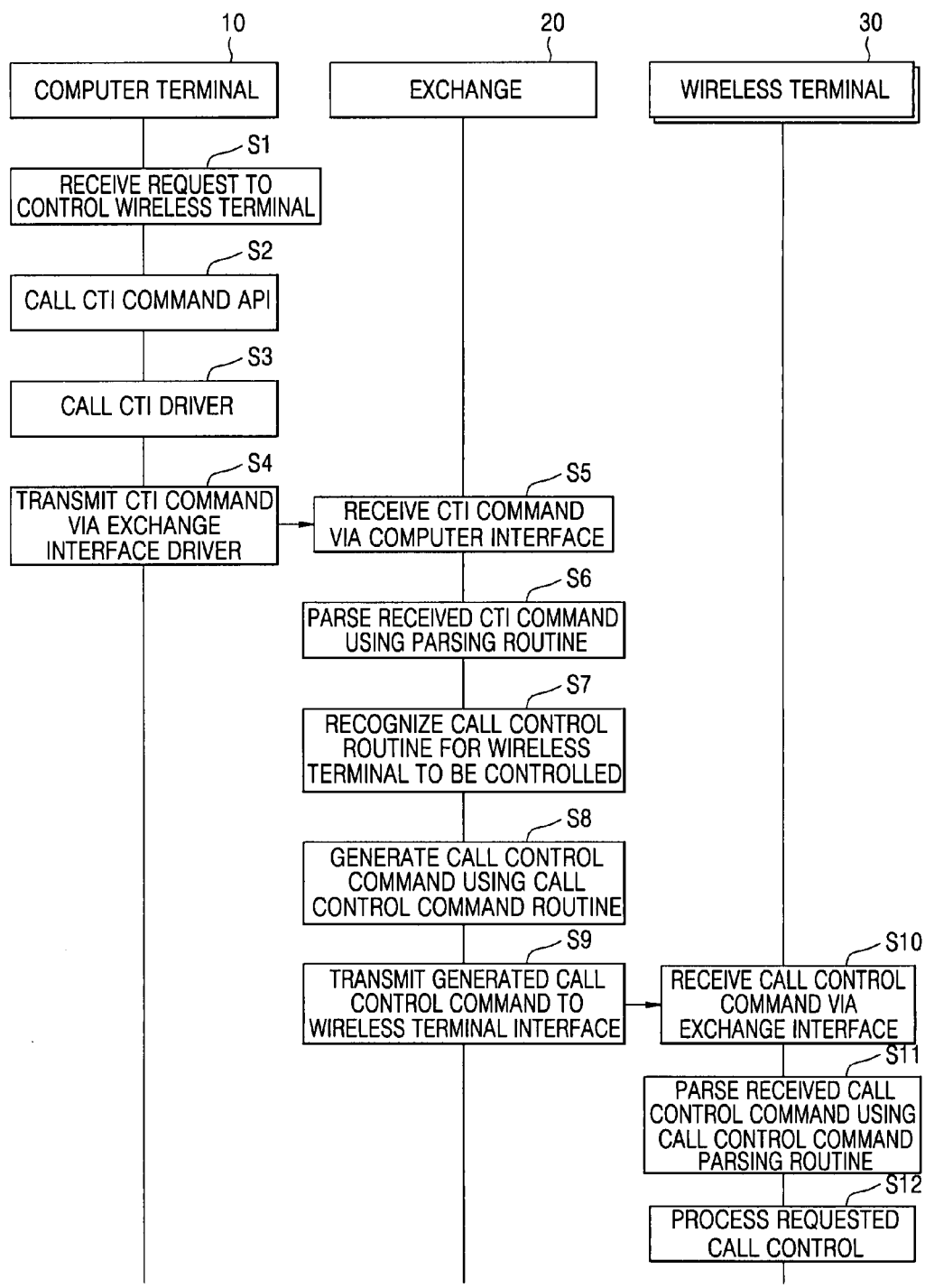
FIG. 1 is a signal flow diagram of the operation of controlling a wireless terminal using a computer terminal of a Computer Telephone Interface (CTI) system.
Figure 2:
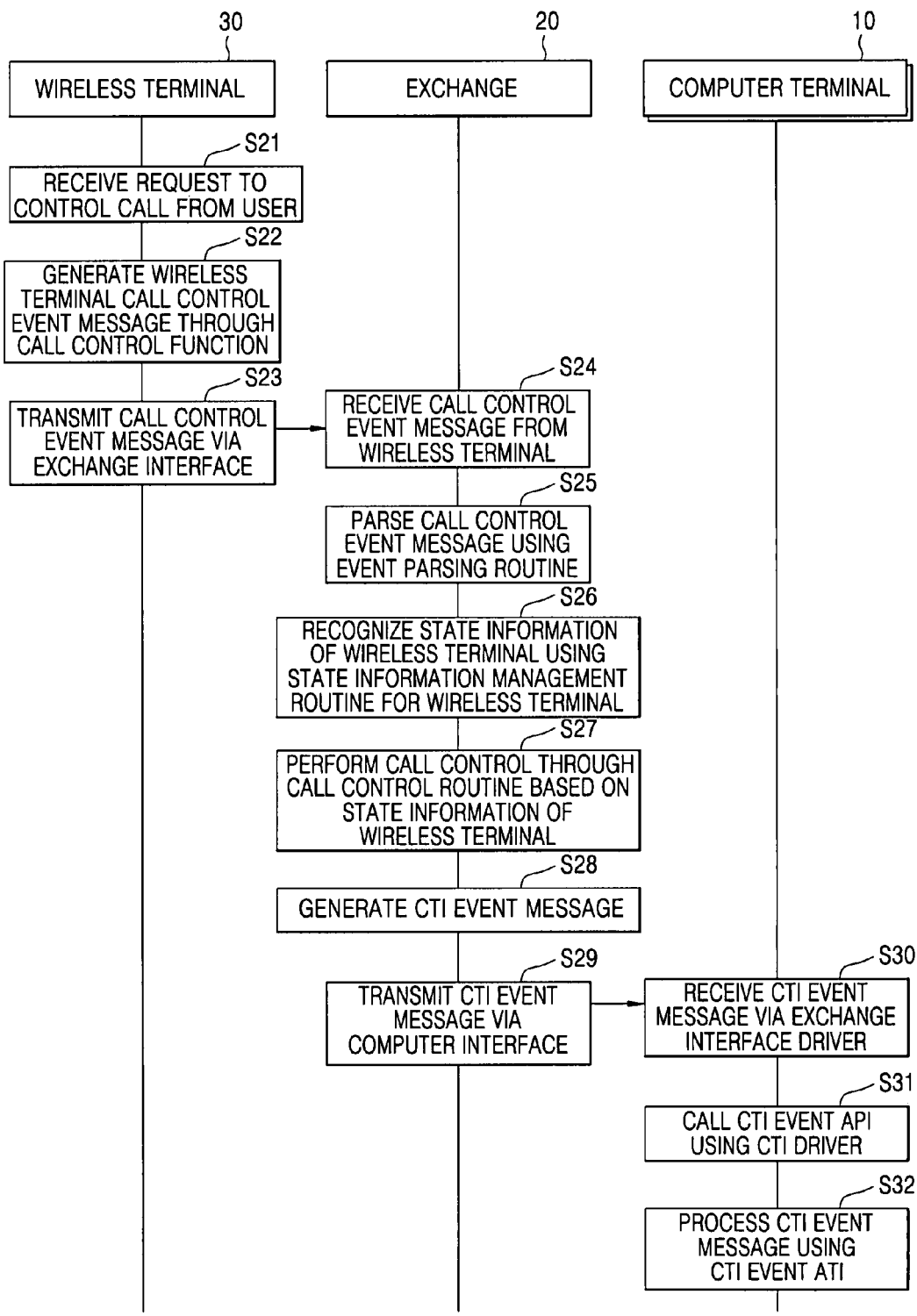
FIG. 2 is a signal flow diagram of the operation of controlling a computer terminal using a wireless terminal of a CTI system.
Figure 3:
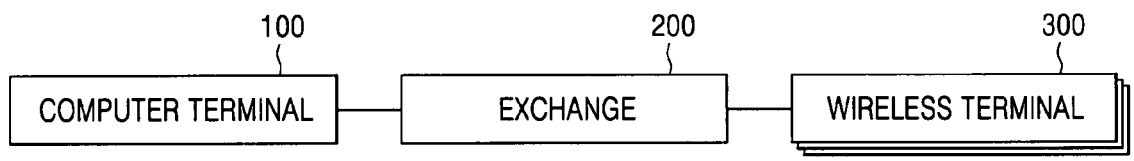
FIG. 3 is a block diagram of a CTI system according to an exemplary embodiment of the present invention.

FIG. 3 is a block diagram of a Computer Telephone Interface (CTI) system according to an exemplary embodiment of the present invention.

Referring to FIG. 3, the CTI system includes a computer terminal 100, an exchange 200, and a number of wireless terminals 300.

In the CTI system, the computer terminal 100 can control each wireless terminal 300 using a CTI application program.

The computer terminal 100 provides a keypad user interface on a display screen using the CTI application program, and converts a call control command for the wireless terminal 300 input from the user via the provided keypad user interface into a call control message using the CTI application program, and transmits the call control message to a desired one of the wireless terminals 300 via the exchange 200.

The computer terminal 100 presets and stores indexes corresponding to key values of the keypad user interface, receives, as a call control command, key values from the user via the keypad user interface, converts each key value into the corresponding index, and generates the call control message including the converted indexes.

The computer terminal 100 includes preset call control identification information before each converted index so that the call control message is promptly transmitted to the wireless terminal 300 via the exchange 200.

The call control message includes a call request message, a call termination message, and the like.

The exchange 200 delivers a call transmitted and received between the computer terminal 100 and the wireless terminal 300.

The wireless terminal 300 effects wireless communication with the other wireless terminals 300 in the CTI system, presets indexes corresponding to key values of the keypad, and converts a command for controlling a call with the computer terminal 100, which is input from the user via the keypad, into a call control message including an index corresponding to each key value.

The wireless terminal 300 presets and store indexes defined according to the promise with the computer terminal 100, and includes preset call control identification information before the index corresponding to each key value to generate the call control message.

Figure 4:
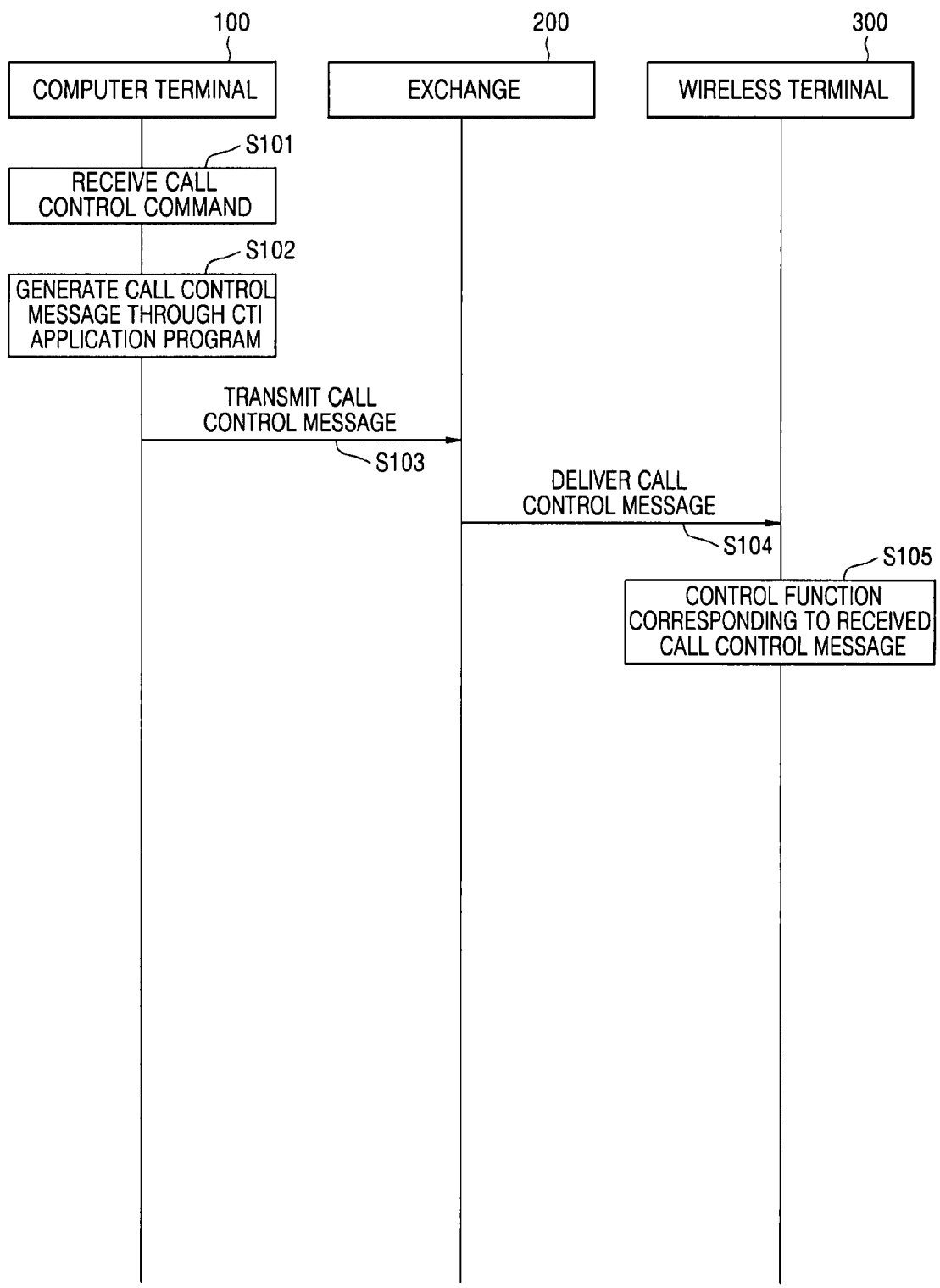
FIG. 4 is a signal flow diagram of the operation of controlling a wireless terminal using a computer terminal of a CTI system according to an exemplary embodiment of the present invention.

FIG. 4 is a signal flow diagram of the operation of controlling the wireless terminal using the computer terminal of the CTI system according to an exemplary embodiment of the present invention.

As shown in FIG. 4, when a call control command has been received from the user via a keypad user interface, which is provided by a CTI application program (S101), the computer terminal 100 generates a call control message through a CTI application program in response to the call control command (S102) and transmits it to the exchange 200 (S103).

The call control message includes a call request message for a voice communication request, a call termination message for a voice communication termination, and the like. The computer terminal 100 receives key values as the call control command via the keypad user interface, converts each key value into a corresponding index, and generates a call control message including each converted index.

The computer terminal 100 includes call control identification information before each converted index so that the call control message is promptly transmitted to the wireless terminal 300 via the exchange 200.

Upon receipt of the call control message from the computer terminal 100, the exchange 200 detects the call control identification information from the received call control message. When the call control identification information has been detected, the exchange 200 maintains the call control message generated by the computer terminal 100 unchanged and interfaces it to the wireless terminal 300 (S104).

When the call control message has been received from the exchange 200, the wireless terminal 300 recognizes the index included in the call control message and controls a function corresponding to the index in order to perform the function (S105).

Specifically, when the recognized index is a call request index, the wireless terminal 300 signals the call request from the computer terminal 100 to the user. When a call response key has been input from the user via the keypad in response to the signaling, the wireless terminal 300 performs a call connection with the computer terminal 100. On the other hand, when the recognized index is a call termination index, the wireless terminal 300 terminates the call connection with the computer terminal 100 and signals the call termination to the user.

FIG. 5 is a table of call control indexes according to an exemplary embodiment of the present invention.

As shown in FIG. 5, the CTI system presets indexes corresponding to key values of the keypad provided by the CTI application program in the computer terminal 100 and the keypad of the wireless terminal 300.

The CTI system uses the preset indexes so that the call control message is transmitted and received between the computer terminal 100 and the wireless terminal 300.

Figure 6:
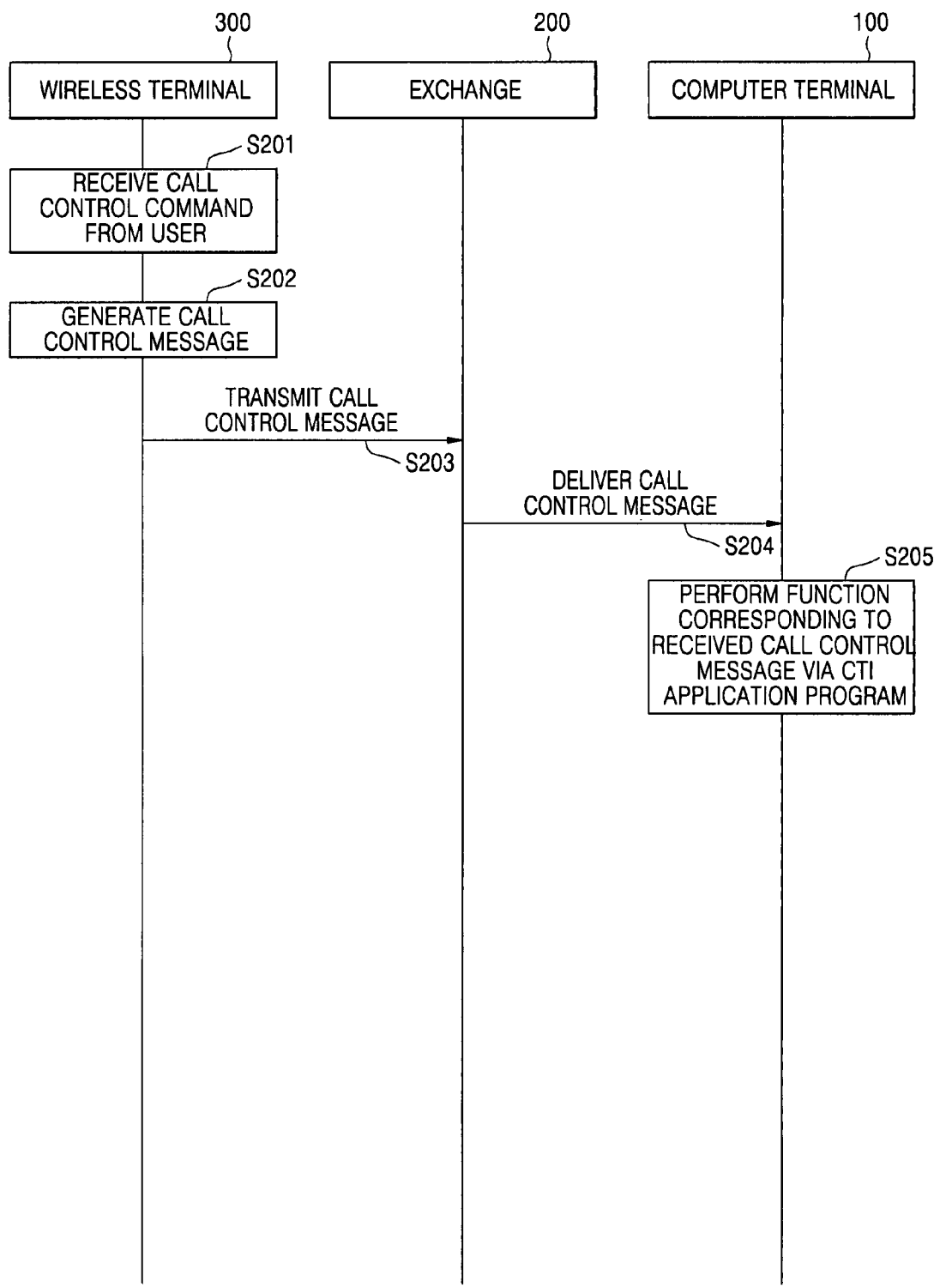
FIG. 6 is a signal flow diagram of the operation of controlling a computer terminal using a wireless terminal of a CTI system according to an exemplary embodiment of the present invention.

FIG. 6 is a signal flow diagram of the operation of controlling the computer terminal using the wireless terminal of the CTI system according to an exemplary embodiment of the present invention.

As shown in FIG. 6, when the wireless terminal 300 in the CTI system attempts to control the computer terminal 100 in response to a user's request, it receives a call control command from the user via the keypad (S201), generates a call control message in response to the call control command (S202), and transmits it to the exchange 200 (S203).

The call control message includes a call request message for a voice communication request, a call termination message for a voice communication termination, and the like.

The wireless terminal 300 receives key values as the call control command via the keypad, converts each key value into a corresponding index, and generates a call control message including the converted index.

The wireless terminal 300 also includes call control identification information before each converted index so that the call control message is promptly transmitted to the computer terminal 100 via the exchange 200.

The exchange 200 receives the call control message from the wireless terminal 300, and detects the call control identification information from the received call control message. When the call control identification information has been detected, the exchange 200 maintains the call control message generated by the wireless terminal 300 unchanged and interfaces it to the computer terminal 100 (S204).

Upon receipt of the call control message from the exchange 200, the computer terminal 100 recognizes the index included in the call control message, and performs a function corresponding to the index through the CTI application program (S205).

Specifically, when the recognized index is a call request index, the computer terminal 100 signals the call request to the user, via the display screen, through the CTI application program. When a call response key has been input from the user via the keypad user interface in response to the signaling, the computer terminal 100 performs a call connection with the wireless terminal 300. On the other hand, when the recognized index is a call termination index, the computer terminal 100 signals the call termination to the user, via the display screen, through the CTI application program.

First, the computer terminal 100 receives a call request command key with the number of the first wireless terminal 300 from a user desiring voice communication with the first wireless terminal 300 via the keypad user interface.

For example, when the number of the computer terminal 100 is 301 and the number of the first wireless terminal 300 is 302, the user presses '3', '0', '2' and 'SEND' keys on the keypad user interface of the computer terminal 100.

When the number of the correspondent wireless terminal 300 and the call request key values, i.e., '3', '0', '2' and 'SEND' are received from the user via the keypad user interface, the computer terminal 100 generates a call request message including indexes corresponding to the key values and identification information of the computer terminal 100 as source information.

In generating the call request message, the computer terminal 100 includes preset call control identification information before each index. This is for enabling the call request message generated by the computer terminal 100 to be kept unchanged and interfaced to the wireless terminal 300 via the exchange 200.

For example, when '@' is used as the call control identification information, the computer terminal 100 includes '@' before the indexes corresponding to the key values '3', '0', '2' and 'SEND' input by the user.

After generating the call request message, the computer terminal 100 transmits the generated call request message to the exchange 200, and the exchange 200 detects the identification information from the call request message. When the identification information has been detected, the exchange 200 maintains the call control message generated by the computer terminal 100 unchanged, and interfaces it to the wireless terminal 300 having the number of 302.

In response to the call request message received from the exchange 200, the wireless terminal 300 signals the call request to a user via an output device, such as a speaker.

When the call request message has been received from the exchange 200, the wireless terminal 300 receives a call response from the user via the keypad.

Upon receipt of the call response from the user, the wireless terminal 300 recognizes a key value input via the keypad, converts the key value into a corresponding index, and generates a call response message including the converted index.

The wireless terminal 300 includes preset call control identification information before the converted index in generating the call response message.

For example, upon receipt of 'OK' as the call response from the user, the wireless terminal 300 converts it into the index '0x43', as shown by the table of FIG. 5, and generates a call response message having the call control identification information included before the converted index.

The wireless terminal 300 then transmits the generated call response message to the exchange 200 so that the call response message is promptly transmitted to the computer terminal 100 via the exchange 200.

Specifically, when the call control identification information has been detected from the message received from the wireless terminal 300, the exchange 200 maintains the call control message generated by the wireless terminal 300 unchanged and interfaces it to a receiving terminal, i.e., the computer terminal 100, indicated by the call control message.

Upon receipt of the call response message from the first wireless terminal 300, the computer terminal 100 recognizes the index included in the received message to confirm that the received call response message is a response to the call request message, and performs a call connection with the first wireless terminal 300.

Figure 7:
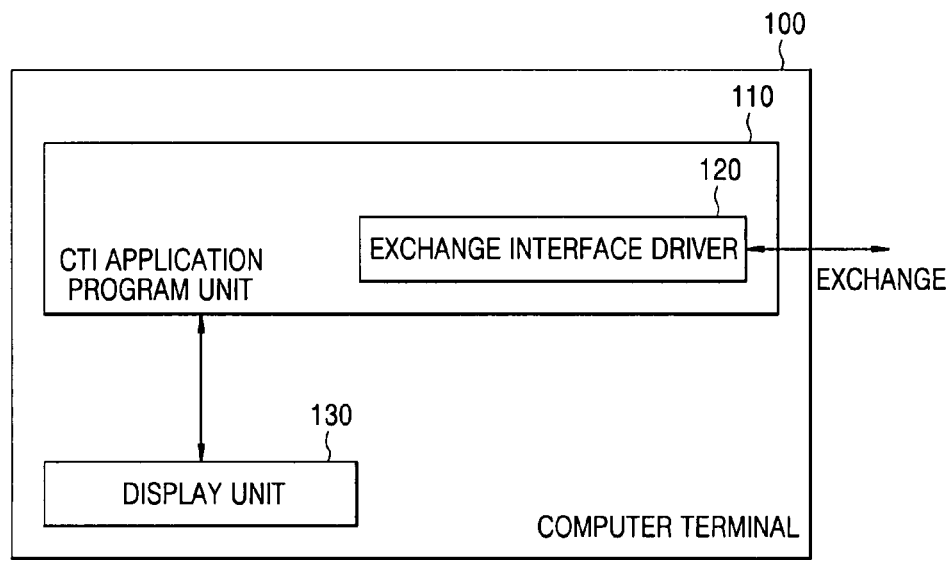
FIG. 7 is a block diagram of a computer terminal according to an exemplary embodiment of the present invention.

FIG. 7 is a block diagram of a computer terminal in a CTI system according to an exemplary embodiment of the present invention.

Referring to FIG. 7, the computer terminal 100 includes a CTI application program unit 110 and a display unit 130.

The CTI application program unit 110 provides the keypad user interface to the display unit 130 and stores the indexes corresponding to the key values of the keypad.

The CTI application program unit 110 includes an exchange interface driver 120. When a call control command has been received from the user via the keypad user interface, the CTI application program unit 110 converts key values associated with the call control command into corresponding indexes using the exchange interface driver 120, generates a call control message including each converted index, and transmits it to the exchange 200.

The exchange interface driver 120 includes call control identification information before each converted index in generating the call control message.

Figure 8:
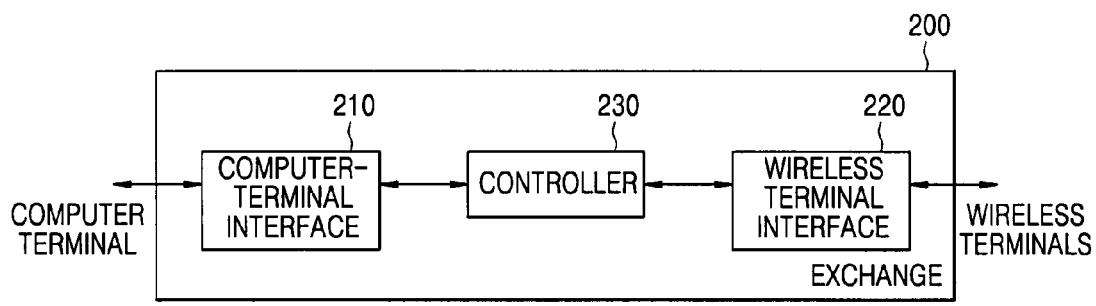
FIG. 8 is a block diagram of an exchange according to an exemplary embodiment of the present invention.

FIG. 8 is a block diagram of an exchange according to an exemplary embodiment of the present invention.

Referring to FIG. 8, the exchange 200 includes a computer-terminal interface 210, a wireless-terminal interface 220, and a controller 230.

The computer-terminal interface 210 transmits and receives the call control message to and from the computer terminal 100, and the wireless-terminal interface 220 transmits and receives a call control message to and from the wireless terminal 300. The controller 230 recognizes the call control message from the computer terminal 100 and the wireless terminal 300.

When the call control message includes the call control identification information, the controller 230 controls the wireless-terminal interface 220 and the computer-terminal interface 210 so that the call control messages generated by the computer terminal 100 and the wireless terminal 300 are kept unchanged and transmitted to the wireless terminal 300 and the computer terminal 100.

Figure 9:
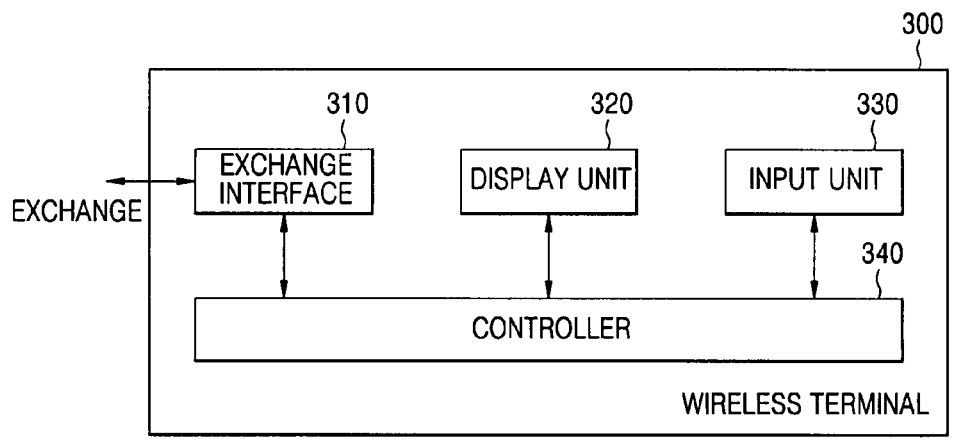
FIG. 9 is a block diagram of a wireless terminal according to an exemplary embodiment of the present invention.

FIG. 9 is a block diagram of a wireless terminal according to an exemplary embodiment of the present invention.

Referring to FIG. 9, the wireless terminal 300 includes an exchange interface 310, a display unit 320, an input unit 330, and a controller 340.

The exchange interface 310 transmits the call control message, which is transmitted and received to and from the computer terminal 100, to the exchange 200, so that the call control message is transmitted to the computer terminal 100 via the exchange 200.

The input unit 330 includes a keypad. The input unit 330 receives a call control key from the user.

The controller 340 recognizes the call control message received from the exchange interface 310, and controls a function corresponding to the index included in the call control message.

Specifically, when the received call control message is a call request message, the controller 340 outputs the call request to the display unit 320 to notify the user. When the received call control message is a call response message corresponding to the call request message transmitted to the computer terminal 100, the controller 340 establishes a call with the computer terminal 100.

When the received call control message is a call termination message, the controller 340 terminates the call, which has been established with the computer terminal 100, and signals the call termination to the user on the display unit 320.

The controller 340 stores the indexes corresponding to the key values of the keypad in the input unit 330, converts key values associated with the call control command input via the keypad into corresponding indexes, and generates a call control message including each converted index.

The controller 340 includes call control identification information before each converted index in generating the call control message.

The CTI system according to the present invention has adopted the exchange as a unit for maintaining the call control message generated by the computer terminal or the wireless terminal unchanged and interfacing it to the wireless terminal or the computer terminal according to the call control identification information included in the received call control message. In other embodiments, however, a keyphone may be used.

With the apparatus and method to manage call control in the computer telephone interface system according to the present invention, the TAPI is not used, and the call control message including the indexes corresponding to key values input from the user and the call identification information is used as a call control message between the computer terminal and the wireless terminal. Thus, CTI system costs are reduced.

While the present invention has been described with reference to exemplary embodiments thereof, it will be understood by those skilled in the art that various modifications in form and detail may be made therein without departing from the scope of the present invention as defined by the following claims.

What is claimed is:

1. A Computer Telephone Interface (CTI) system comprising:
   a computer terminal to generate a call control message comprising call control identification information using a CTI application program in response to a call control command from a user, and to transmit the generated call control message;
   a wireless terminal to perform call control upon receipt of the call control message; and an exchange to receive the call control message from the computer terminal, and to maintain the call control message generated by the computer terminal unchanged and to interface it to the wireless terminal in response to the call control identification information being detected from the received call control message.

2. The system of claim 1, wherein the computer terminal comprises a keypad user interface for the user using the CTI application program and recognizes key values, input via the keypad user interface, as the call control command.

3. The system of claim 2, wherein the computer terminal presets and stores indexes corresponding to key values of the keypad user interface, converts key values input according to the call control command into corresponding ones of the stored indexes, and generates a call control message comprising the converted indexes.

4. The system of claim 3, wherein the computer terminal comprises the call control identification information before each converted index in generating the call control message.

5. The system of claim 1, wherein the call control message comprises a call request message, a call response message, and a call termination message.

6. The system of claim 1, wherein the computer terminal comprises:
a CTI application program unit to provide a keypad user interface, to store indexes corresponding to key values of the keypad user interface, to convert key values associated with the call control command input from the user into corresponding indexes, and to generate a call control message comprising the converted indexes; and
a display unit to display the keypad user interface provided by the CTI application program unit.

7. The system of claim 6, wherein the CTI application program unit comprises an exchange interface driver to convert the key values associated with the call control command into the corresponding indexes, comprising the call control identification information before each converted index to generate the call control message, and to transmit the generated call control message to the exchange.

8. The system of claim 1, wherein the exchange comprises:
a computer-terminal interface to receive the call control message from the computer terminal;
a controller to detect the call control identification information from the call control message received from the computer-terminal interface; and
a wireless-terminal interface to maintain the call control message generated by the computer terminal unchanged and to interface it to the wireless terminal in response to the controller detecting the call control identification information from the call control message.

9. A Computer Telephone Interface (CTI) system comprising:
a wireless terminal to generate a call control message comprising call control identification information in response to a call control command from a user, and to transmit the generated call control message;
a computer terminal to perform call control using a CTI application program upon receipt of the call control message; and
an exchange to receive the call control message from the wireless terminal and to maintain the call control message generated by the wireless terminal unchanged and to interface it to the computer terminal in response to the call control identification information being detected from the received call control message.

10. The system of claim 9, wherein the wireless terminal comprises a keypad unit and recognizes key values, input via the keypad unit, as the call control command.

11. The system of claim 10, wherein the wireless terminal presets and stores indexes corresponding to key values of the keypad, converts key values input according to the call control command into corresponding ones of the stored indexes, and generates a call control message comprising the converted indexes.

12. The system of claim 11, wherein the wireless terminal comprises the call control identification information before each converted index in generating the call control message.

13. The system of claim 9, wherein the wireless terminal comprises:
a keypad comprising a number of keys and receiving key values for call control by the user;
a controller to preset and store indexes corresponding to key values of the keypad, to receive key values associated with the call control command, to convert the received key values to corresponding ones of the stored indexes comprising the call control identification information before each index, and to generate a call control message comprising the indexes with the call control identification information; and
an exchange interface to transmit the generated call control message to the exchange.

14. The system of claim 9, wherein the exchange comprises:
a wireless-terminal interface to receive the call control message from the wireless terminal;
a controller to detect the call control identification information from the call control message received from the wireless-terminal interface; and
a computer-terminal interface to maintain the call control message generated by the wireless terminal unchanged and to interface it to the computer terminal in response to the controller detecting the call control identification information from the call control message.

15. A method of controlling a call in a Computer Telephone Interface (CTI) system, the method comprising:
generating, by a computer terminal, a call control message comprising call control identification information using a CTI application program in response to a call control command from a user;
transmitting, by the computer terminal, the generated call control message to an exchange;
maintaining, by the exchange, the call control message generated by the computer terminal unchanged and interfacing it to a wireless terminal in response to detecting the call control identification information from the received call control message; and
performing, by the wireless terminal, call control in response to the interfaced call control message.

16. The method of claim 15, wherein generating, by a computer terminal, a call control message comprising call control identification information using a CTI application program in response to a call control command from a user further comprises:
providing a keypad user interface to the user using the CTI application program; and
receiving, as the call control command, key values for call control from the user via the keypad user interface.

17. The method of claim 16, wherein generating, by a computer terminal, a call control message comprising call control identification information using a CTI application program in response to a call control command from a user further comprises:

resetting and storing indexes corresponding to key values of the keypad user interface;

converting the key values into corresponding ones of the stored indexes in response to the key values associated with the call control command being received from the user via the keypad user interface; and generating the call control message comprising the converted indexes.

18. The method of claim 17, wherein generating, by a computer terminal, a call control message comprising call control identification information using a CTI application program in response to a call control command from a user further comprises including the call control identification information before each converted index.

19. The method of claim 15, wherein generating, by a computer terminal, a call control message comprising call control identification information using a CTI application program in response to a call control command from a user further comprises generating a call control message comprising at least one of a call request message, a call response message, and a call termination message.

20. A method of controlling a call in a Computer Telephone Interface (CTI) system, the method comprising:

generating, by a wireless terminal, a call control message comprising call control identification information in response to a call control command from a user, and transmitting the generated call control message to an exchange;

maintaining, by the exchange, the call control message generated by the wireless terminal unchanged and interfacing it to a computer terminal in response to detecting the call control identification information from the received call control message; and performing, by the computer terminal, call control using a CTI application program according to the interfaced call control message.

21. The method of claim 20, wherein generating, by a wireless terminal, a call control message including call control identification information in response to a call control command from a user, and transmitting the generated call control message to an exchange further comprises providing a keypad to the wireless terminal and receiving, as the call control command, key values for call control from the user via the keypad.

22. The method of claim 21, wherein generating, by a wireless terminal, a call control message comprising call control identification information in response to a call control command from a user, and transmitting the generated call control message to an exchange further comprises:

resetting and storing indexes corresponding to key values of the keypad;

converting key values into corresponding ones of the stored indexes in response to the key values associated with the call control command being received from the user via the keypad; and generating the call control message comprising the converted indexes.

23. The method of claim 22, wherein generating, by a wireless terminal, a call control message comprising call control identification information in response to a call control command from a user, and transmitting the generated call control message to an exchange further comprises including the call control identification information before each converted index.

* * * * *